(12) United States Patent
Dauer et al.

(10) Patent No.: US 8,190,567 B2
(45) Date of Patent: May 29, 2012

(54) METHOD AND SYSTEM FOR PROVIDING ONE-TO-ONE EMAIL COLLABORATION

(75) Inventors: Martin Dauer, Alsting (FR); Tim Back, Mannheim (DE)

(73) Assignee: SAP AG, Walldorf (DE)

( * ) Notice: Subject to any disclaimer, the term of this patent is extended or adjusted under 35 U.S.C. 154(b) by 309 days.

(21) Appl. No.: 11/026,060

(22) Filed: Jan. 3, 2005

(65) Prior Publication Data

US 2006/0095476 A1 May 4, 2006

Related U.S. Application Data

(60) Provisional application No. 60/620,684, filed on Oct. 22, 2004.

(51) Int. Cl.
*G06F 17/00* (2006.01)

(52) U.S. Cl. .......................... 707/613; 709/206; 709/207

(58) Field of Classification Search .................. 707/100; 709/204, 202
See application file for complete search history.

(56) References Cited

U.S. PATENT DOCUMENTS

| | | | | |
|---|---|---|---|---|
| 6,549,612 B2 * | 4/2003 | Gifford et al. | ............... | 379/67.1 |
| 2002/0124057 A1 * | 9/2002 | Besprosvan | ................... | 709/219 |
| 2002/0169840 A1 * | 11/2002 | Sheldon et al. | ............... | 709/206 |
| 2003/0131016 A1 * | 7/2003 | Tanny et al. | ................... | 707/102 |
| 2004/0230652 A1 * | 11/2004 | Estrada et al. | ................. | 709/204 |
| 2005/0202392 A1 * | 9/2005 | Allen et al. | ................... | 434/362 |
| 2006/0015533 A1 * | 1/2006 | Wolf et al. | ................. | 707/104.1 |
| 2007/0022155 A1 * | 1/2007 | Owens et al. | ................. | 709/202 |

* cited by examiner

*Primary Examiner* — Tony Mahmoudi
*Assistant Examiner* — Michele Choi
(74) *Attorney, Agent, or Firm* — Kenyon & Kenyon LLP

(57) ABSTRACT

A management application to synchronize e-mails sent or received from one application with e-mail logs of another application. If the groupware application receives an e-mail from a business partner, the e-mail may be stored in communication records maintained by the CRM application. Similarly, if an operator composed and sends an e-mail via the CRM application, the e-mail may be copied to the e-mail records of the groupware application. In managing this synchronization, it is sufficient for the management application to copy an e-mail from one application to the other. No further oversight is required.

18 Claims, 8 Drawing Sheets

200

Business Object Assignment - Microsoft Internet Explorer provided by SAP IT

Business Object Assignment tim.back@sap.com

Additional Business Partners

| Business Partner | Name 1/Last Name | Name 2/First Name |
|---|---|---|
| ☐ BACK | BAck | Tim |
| ■ BACKPERS | Back | Tim |

Partner Data / Offers

| Transaction Number | Sold-To Party | Valid From | Valid To | Status | Total Net Value | Crcy |
|---|---|---|---|---|---|---|
| ■ TIMS OFFER | Tim Back / 10045 New York | | | Quotation created | 0,00 | |

Selected Business Objects

Assign

| Business Object Type | ID | Description |
|---|---|---|
| Person | BACKPERS | Tim Back |
| Quotation | TIMS OFFER | |

METHOD AND SYSTEM FOR PROVIDING ONE-TO-ONE EMAIL COLLABORATION

CROSS-REFERENCE TO RELATED APPLICATION

This application claims the benefit of priority afforded by provisional application Ser. No. 60/620,684, filed Oct. 22, 2004.

BACKGROUND

The present invention relates to methods and systems for synchronizing e-mail communications among multiple applications in a computer system. In particular, it relates to methods and systems for providing one to one e-mail collaboration among multiple users working on related tasks using discrete software applications.

As enterprises continue to grow in size and complexity, they have attempted to bring their business processes close with those of their customers, suppliers, and other business partners to provide more efficient services and to preserve their competitiveness. One solution was to integrate business processes beyond enterprise boundaries and to provide collaborative business processes by sharing enterprise software applications that were deployed by organizations to implement business processes.

SAP's Customer Relationship Management ("CRM") application is an example of such a shared enterprise software application. The CRM application provides collaborative business processes to support marketing, sales, and service of a product among multiple users. In particular, the CRM application supports multiple users working on related tasks, allows access to the same data, and helps its users coordinate and keep track of ongoing projects together. The heart of the CRM application or any other interlinked enterprise software applications is a messaging system. Electronic mail (e-mail) is used to notify users, to obtain responses, to send alerts, and to provide communication among all the multiple users. E-mail messages also may include links to databases, intranets, and the internet. Thus, the CRM system includes its own e-mail server with SMTP capability. Typically, clients and business partners communicate through their e-mail application (e.g., Microsoft's Outlook, Lotus Notes, among others) and the contents of these e-mails are processed and stored by centralized enterprise software applications. The CRM application also sends notifications and responses to the clients in electronic mail form. In this way, the users of the CRM application can provide flexible and reliable communication among all users and maintain relations between the company and its clients, business partners, and other interested parties.

Often, however, the clients or business partners' own e-mail applications are written in different programming languages and run in different runtime environments or on different platforms than the interlinked enterprise software application. Thus, inbound e-mails that are related to the CRM application might arrive in an existing e-mail application. Outbound e-mails that are related to the CRM application may also lose its contents when transmitted to the recipient's e-mail application if not compatible. To obtain synchronized e-mail logs in two applications, therefore, users are often required to store copies of redundant e-mails and data on multiple applications. For example, an operator may maintain the same e-mails and data on his/her e-mail application as well as the shared enterprise software applications such as the CRM application. To relieve operators from having to copy common e-mails/data multiple times for different applications, there is a need for a method and system that provides collaborative e-mail communication among multiple users.

Accordingly, the present inventors perceive these and other needs in the art.

BRIEF DESCRIPTION OF THE DRAWINGS

FIG. 4B is a screenshot illustrating an exemplary business object assignment window used in processing inbound e-mails, according to an embodiment of the present invention.

FIG. 4C is a screenshot illustrating an exemplary activity stored in the CRM application during the inbound e-mail process, according to an embodiment of the present invention.

FIG. 5 is a screen shot illustrating an exemplary browser for processing inbound e-mails, according to another embodiment of the present invention.

DETAILED DESCRIPTION

Embodiments of the present invention provide a method and system for synchronizing inbound and outbound e-mail communications among multiple applications in a computer system. Embodiments described herein allow e-mails to be kept track in both the e-mail application and the enterprise software application without losing any email data. Throughout the following description, a CRM application is used as an example of an enterprise software application that may be shared among multiple users, and a groupware application is used as an example of an e-mail application. These examples have been used with the expectation that doing so makes it easier to explain the principles of the present invention to a lay audience. The principles of the present invention, however, are not so limited and may find application in with other enterprise applications that include dedicated e-mail support.

Figure 1:
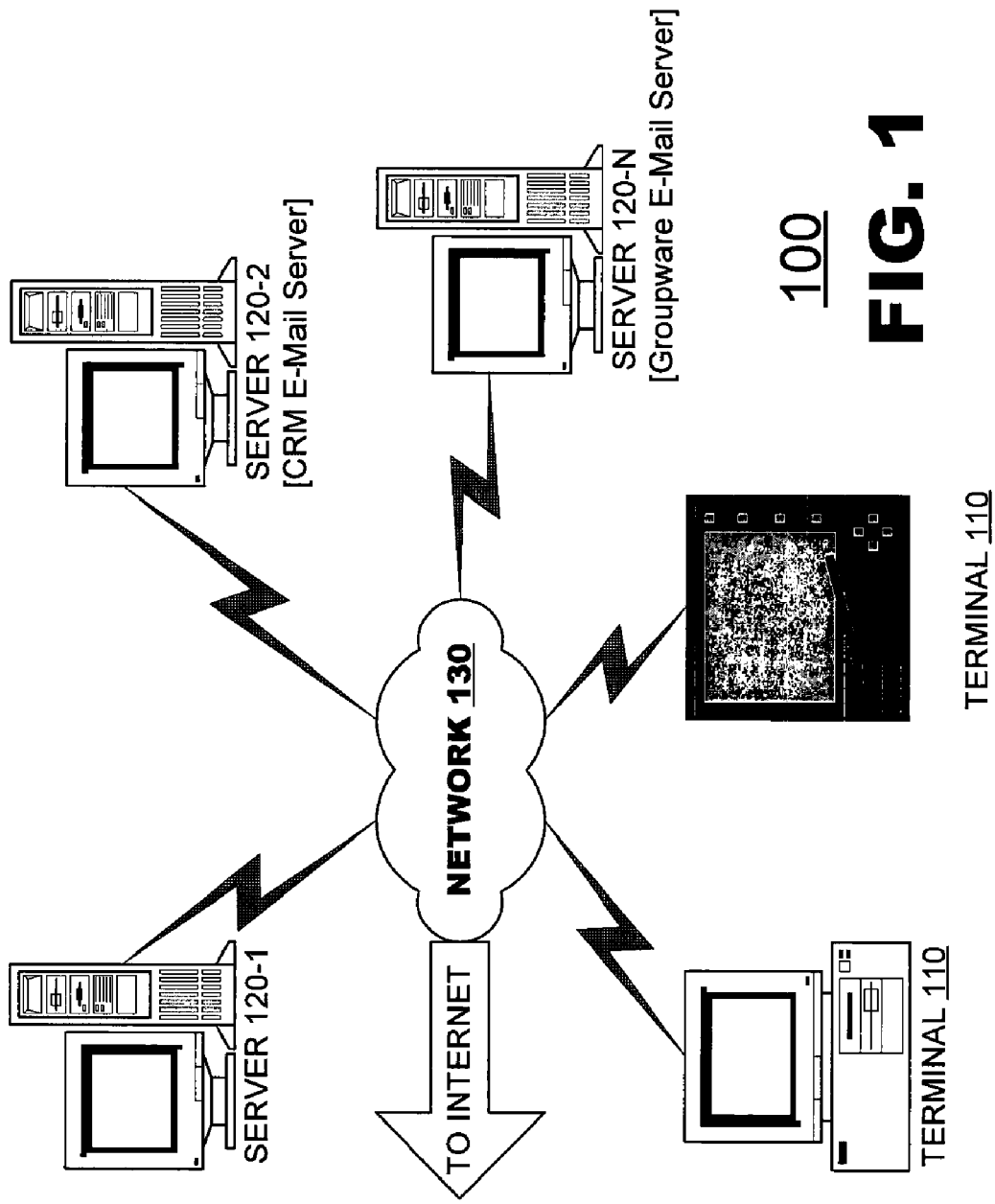
FIG. 1 is a simplified block diagram of an exemplary computer system that provides collaborative e-mail communication among multiple users, according to an embodiment of the present invention.

FIG. 1 illustrates a computer network 100 according to an embodiment of the present invention. The computer network 100 may include various terminals 110 and servers (collectively, 120) coupled together via a network fabric 130. Some of the servers (e.g., 120-1, 120-2) may execute application programs that define an enterprise management system (EMS), which may include, for example, customer relations management ("CRM") applications among others. Still other servers may execute other applications outside the domain of the EMS. For example, a server 120-N may be provided as an e-mail server to support a groupware application.

Conventionally, a CRM application executes application programs that permit an operator to manage marketing, sales and services activity with respect to its customers. Thus, the CRM application maintains various databases that: define business processes through which the operator manages such business operations, identify the operator's business partners and record business activities conducted with respect to each business partner. Various servers (e.g., 120-1, 120-2) may be dedicated to provide this functionality. Indeed, CRM applications may include an e-mail server (say, 120-2) that supports SMTP communication to permit the operators to exchange e-mail messages with its business partners. In this regard, the structure and operation of CRM applications are well known.

Computer systems also typically support additional applications such as the groupware applications identified above. To support groupware applications, the computer system 100 may include a second e-mail server that manages exchange of e-mail messages generated by operators via the groupware application. For example, an operator may compose an e-mail message via a groupware application and, when the message is ready to send, the operator's terminal may communicate with the groupware e-mail server to transmit the e-mail message to its destination, perhaps out of the computer system to another network via the Internet. In this regard, the structure and operation of groupware applications are well known.

Embodiments of the present invention introduce a management application to synchronize e-mails sent or received from one application with e-mail logs of another application. Thus, if the groupware application receives an e-mail from a business partner, the e-mail may be stored in communication records maintained by the CRM application. Similarly, if an operator composed and sends an e-mail via the CRM application, the e-mail may be copied to the e-mail records of the groupware application. In managing this synchronization, it is sufficient for the management application to copy an e-mail from one application to the other. No further oversight is required.

Figure 2:
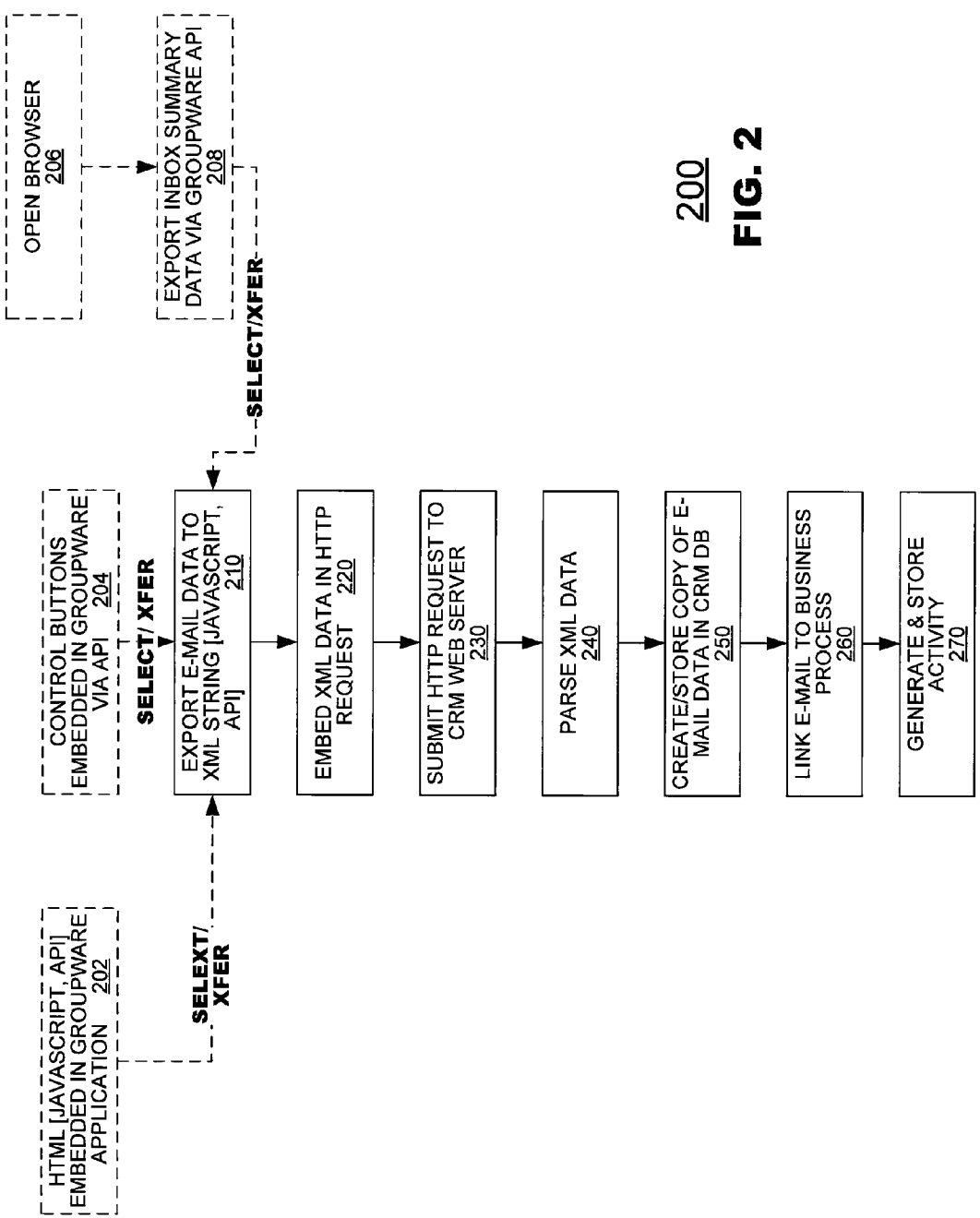
FIG. 2 illustrates a method for processing inbound e-mails, according to an embodiment of the present invention.

FIG. 2 illustrates a method 200 for synchronizing an e-mail message received from the CRM application, according to embodiments of the present invention. The method 200 may begin when e-mails are selected from the groupware application's e-mail logs or inbox to be copied to the CRM application. The transfer may be initiated either at the operator's request or by the system in a predetermined manner. When the transfer is initiated, the method 200 may export e-mail data of the selected e-mail(s) to an Extensible Marked-Up Language ("XML") string (box 210). According to an embodiment of the present invention, the XML string may be defined similar to the Multipurpose Internet Mail Extensions ("MIME") format to allow transmission of complex e-mails. The method 200 may extract XML data from the XML string and embed the XML data in a HyperText Transport Protocol ("HTTP") request (box 220). The method 200 may then submit the HTTP request to a CRM Web server (box 230). When received by the CRM application, the method 200 may extract the XML data from the HTTP request and parse the XML data to extract the email data (box 240). The CRM application may create a copy of e-mail data and store the copy in its e-mail database (box 250). The CRM application may then link each e-mail to its intended business process or business object based on its recipient(s) and contents (box 260). Based on this e-mail data, the CRM application may generate an activity and store it in the activity database of the CRM application (box 270). The method 200 thereafter may conclude.

As is known to those skilled in the art, the CRM application documents an interaction (e.g. itemizes an interaction) with a client and/or business partner as an "activity", which may be related to all aspects of the daily selling processes. An activity may include information sheet and record events (i.e., which operator has been in contact with a client or business partner), time of these events, and status of these activities. The activities may appear automatically in all employees' and business partners' CRM application and allow the CRM operators to be informed at all times. Thus, the method 200 may also create a link within an activity to one or more of the transferred e-mail that are related/relevant to that activity.

The groupware application may adapt different schemes to initiate the e-mail transfer based on its type. According to one embodiment, the groupware application may include a HyperText Marked-Up Language ("HTML") page embedded therein via JavaScript and Application Programming Interface ("API") (box 202). This scheme is particularly useful for groupware applications with ActiveX controls. The operator may set the HTML page to a CRM homepage and select e-mails in the groupware's inbox to be synchronized with e-mail logs in the CRM application. The transfer may then be initiated by allowing a JavaScript component to access the e-mail logs stored in the groupware application either at the operator's request, periodically or in a rule-based manner. Because ActiveX controls allow a Web-page to work like software launched from a server, the groupware application may then be able to open up its API and allow access to the groupware's e-mail logs including its contents, recipient(s), sender, and the like via JavaScript. ActiveX controls may be embedded into an HTML page simply by providing an HTML tag.

According to another embodiment, the groupware application may include a control button embedded therein via API (box 204). API may automatically invoke transfer function calls available on the system when the control button is pressed. Thus, the method 200 may select e-mails stored in the groupware to be transferred to the CRM application, and initiate the transfer by pressing the control button. This scheme is useful for both the groupware applications with ActiveX controls and the groupware applications without ActiveX controls. By adapting a control button, the method 200 allows the operator to choose when to initiate the transfer, rather than initiating on its own in a predetermined manner.

According to yet another embodiment, the method 200 may adapt a discrete browser with ActiveX controls. The browser may be different and discrete from the groupware application and serve as a front end to a CRM homepage on the Internet. The discrete browser may be opened periodically at predetermined intervals or at the operator's request (box 206). The groupware application may then export inbox summary data via API from its inbox to the discrete browser when the browser is open (box 208). The inbox summary may be replicas of all e-mails in the inbox since the last transfer, or it may only contain high-level e-mail data. The method 200 may then select e-mails from the discrete browser to be transferred to the CRM application and initiate the transfer. This scheme is particularly useful for those groupware applications that do not have the option to embed arbitrary HTML pages located on arbitrary resources.

Additionally, for groupware applications with ActiveX controls, the groupware application may prompt the operator to make additional assignments to the selected emails by providing one or more pop-up assignment windows. For example, the groupware application may prompt the operator to specify the business partners, the type of activities, or the type of information the email contains if the operator chooses to do so. In this way, the operator can link the emails to CRM activities without having to switch to the CRM application according to a particular business need.

According to an embodiment of the present invention, the e-mails that are transferred may be marked as "transferred" in the groupware application. This allows the operator to keep track of all e-mails transferred from the groupware's inbox.

Also, marking transferred e-mails may prevent duplicate transfers of the CRM related e-mails.

When the inbound e-mail process is completed, both the groupware application and the CRM application have a copy of the e-mail. Because both contain a copy, no further synchronization between the e-mail stored in the groupware application and that in the CRM application is needed.

Figure 3:
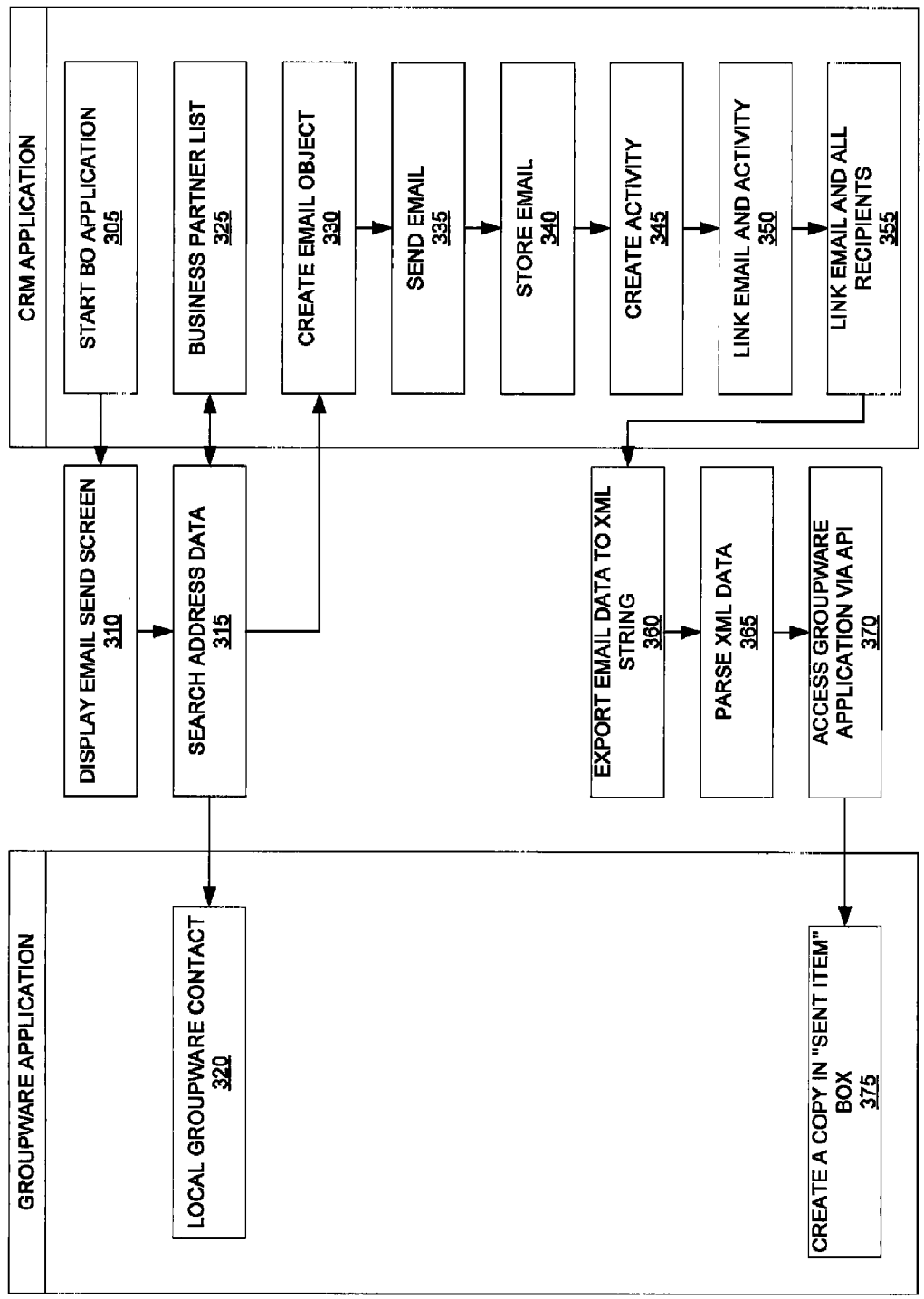
FIG. 3 illustrates a method for processing outbound e-mails, according to another embodiment of the present invention.

FIG. 3 illustrates a method 300 for processing an "outbound" e-mail generated at the CRM server, according to another embodiment of the present invention. The method 300 starts when the operator chooses to send an e-mail by pressing an e-mail button in the CRM application (box 305). A send screen may come up when the e-mail button is pressed (box 310). The operator may enter the e-mail address of a contact person (box 315). Alternatively, the operator may search for an e-mail address either from a local groupware contact database using API or from a list of business partners stored in the CRM application (boxes 320 and 325). The operator may then create an e-mail object by entering an e-mail body and/or by adding attachments to the e-mail from its local hard disk, documents linked to the CRM application, customized templates, and the like (box 330).

When the operator chooses to send an e-mail (i.e., by pressing a "send" button), an e-mail is sent from the CRM application via Simple Mail Transfer Protocol ("SMTP") to the CRM Mail Server (box 335). The sent e-mail is stored in the CRM e-mail database (box 340). Also, a CRM activity is automatically created using the e-mail data and is stored in the CRM activity database (box 345). The CRM activity is then linked to the sent e-mail (box 350) and also to all recipients including all business partners (box 355). For example, when the e-mail is linked to a CRM activity, the e-mail body may define its text, the e-mail subject may define the activity's description, the e-mail may define a linked document, and all e-mail recipients may define business partners. In this regard, the operation of the CRM system is well known.

Embodiments of the present invention export the CRM generated e-mail to the groupware application's e-mail logs. To support this process, the e-mail data is exported to an XML string using JavaScript and API (box 360). According to one embodiment of the present invention, the XML string may be defined similar to the Multipurpose Internet Mail Extension ("MIME") specifications by the World Wide Web Consortium ("W3C"), and is, therefore, capable of handling complex e-mails. The XML data may then be parsed using JavaScript (box 365). Using the parsed data, JavaScript accesses the groupware application via its API (box 370) and creates a copy of the e-mail in the groupware's record of transmitted e-mails (box 375).

Again, when the outbound e-mail process is completed, both the groupware application and the CRM application have a copy of the e-mail. Because both contain a copy, no further synchronization between the e-mail stored in the groupware application and that in the CRM application is needed.

Figure 4A:
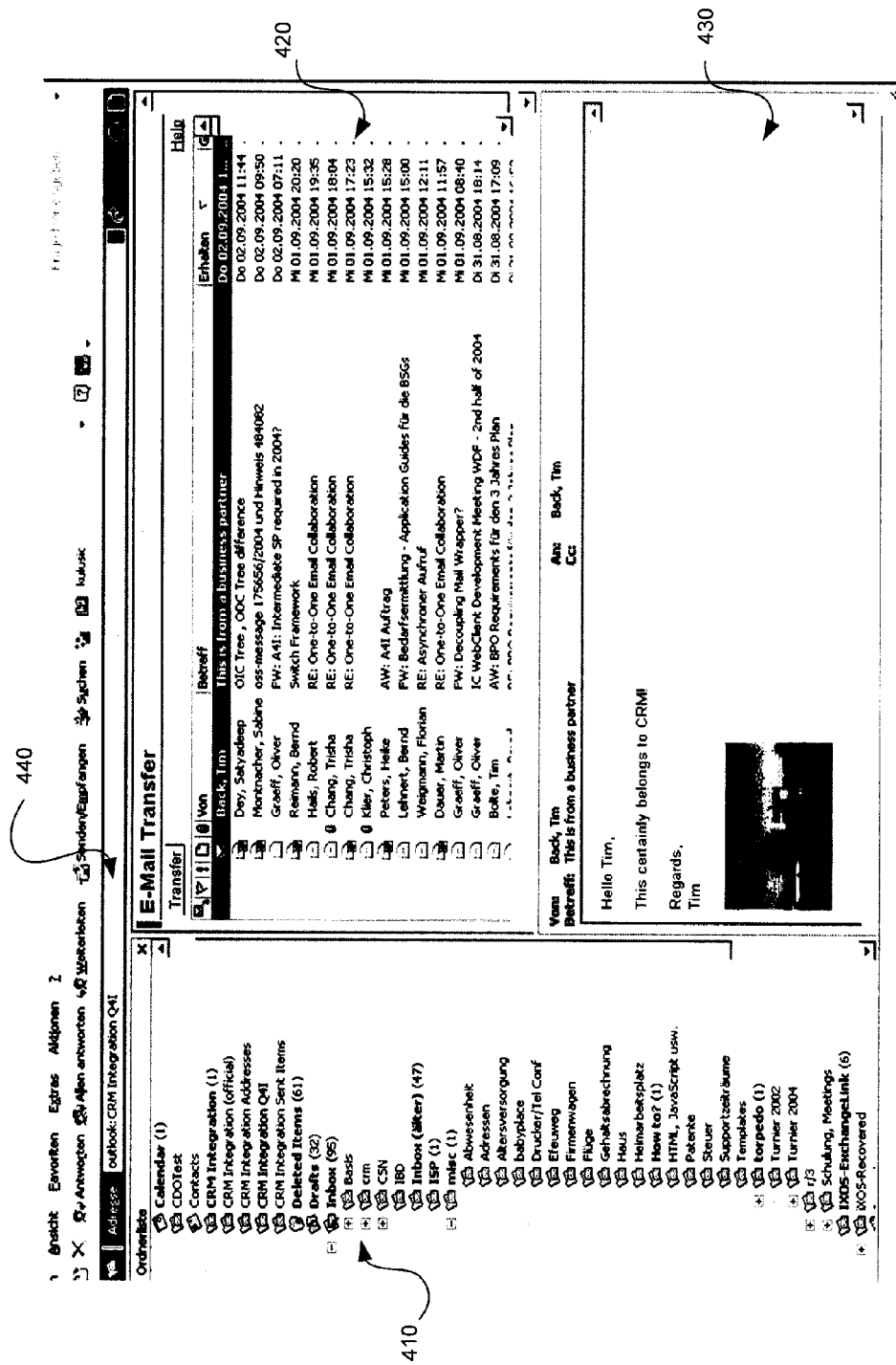
FIG. 4A is a screen shot illustrating an exemplary groupware for processing inbound e-mails, according to an embodiment of the present invention.

FIG. 4A is a screen shot illustrating an exemplary groupware application for processing inbound e-mails, according to an embodiment of the present invention. The groupware application 400 may have a typical three-panel view: a first panel 410 shows a folder list, which lists multiple folders storing related e-mails, a second panel 420 shows e-mails stored in a folder selected by the operator, and a third panel 430 shows the content of one of the e-mails stored in the selected folder. The groupware application 400 also includes a navigation bar 440 in which the operator may identify Uniform Resource Locator ("URL") of the CRM homepage. The groupware application 400 may also include a transfer button embedded therein via API. Thus, the API may automatically invoke transfer function calls when the transfer button is pressed by the operator. Additionally, e-mails that are transferred to the CRM application may be marked as "transferred" to distinguish e-mails that have been transferred from the rest and to prevent duplicative transfer of e-mails.

When the transfer button is pressed, a new window may come up to allow the operator to select which business process within the CRM application the transfer e-mail should be linked to. FIG. 4B illustrates an exemplary business object ("BO") assignment window used in processing inbound e-mails, according to an embodiment of the present invention. The BO identification process starts with the sender's e-mail address. In particular, the sender's e-mail address may be matched to business partners of the CRM application. The BO assignment window may then allow the operator to select other business objects that are linked to the identified business partner such as quotations and opportunities.

Figure 4C:
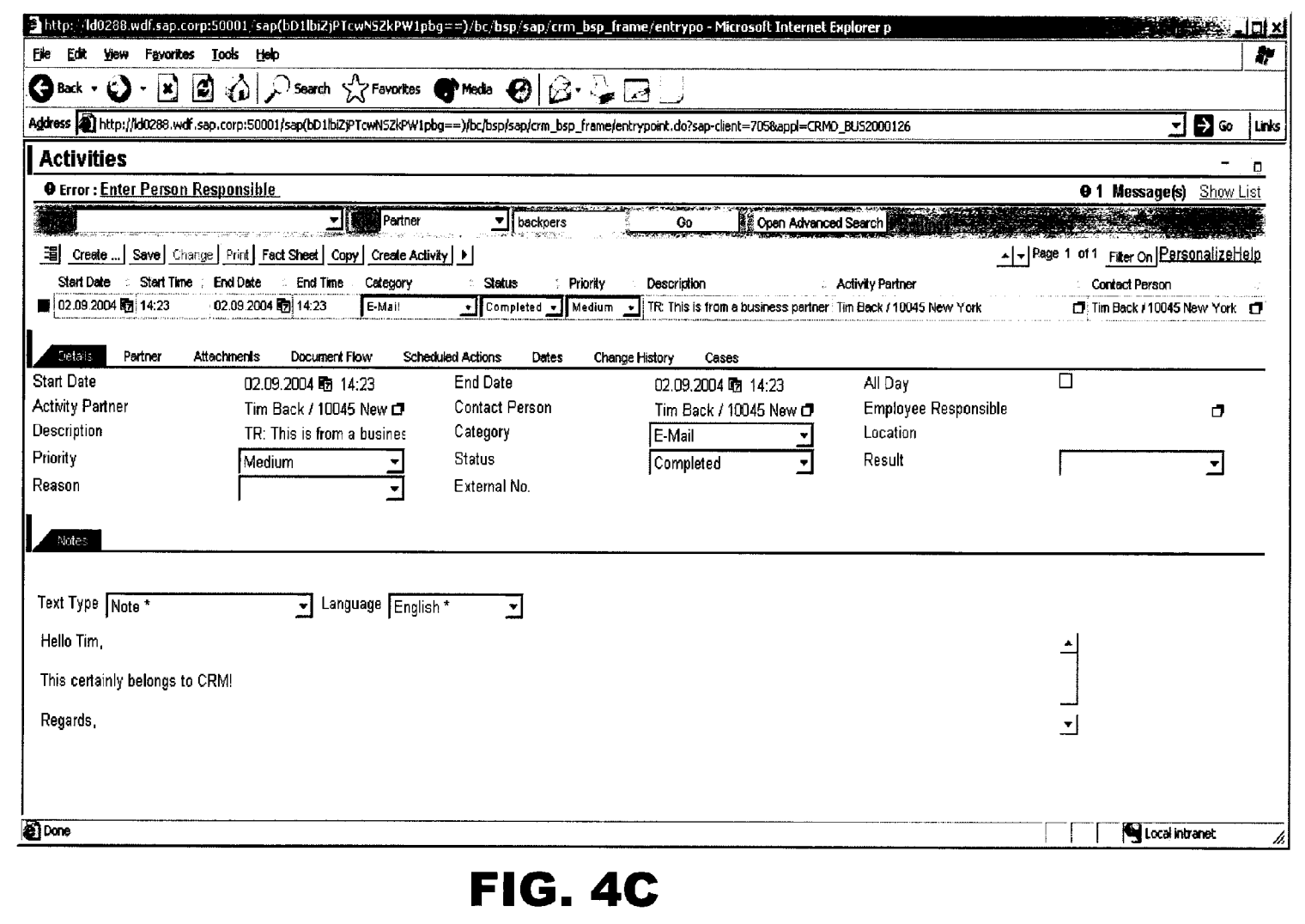

When the BO assignment is made, a copy of the e-mail is transferred to the CRM application. Because both the groupware application and the CRM application contain a copy of the email, no further synchronization between these two applications is required. When the e-mail is received by the CRM application, a CRM activity is automatically created using the e-mail data. The CRM activity has a customized transaction type. FIG. 4C illustrates an exemplary CRM activity stored in the CRM application during the inbound e-mail process, according to an embodiment of the present invention. Thus, for example, the CRM activity may contain the e-mail body as its text, the e-mail subject as a description, the e-mail as a linked document, and all e-mail recipients as business partners.

Figure 5:
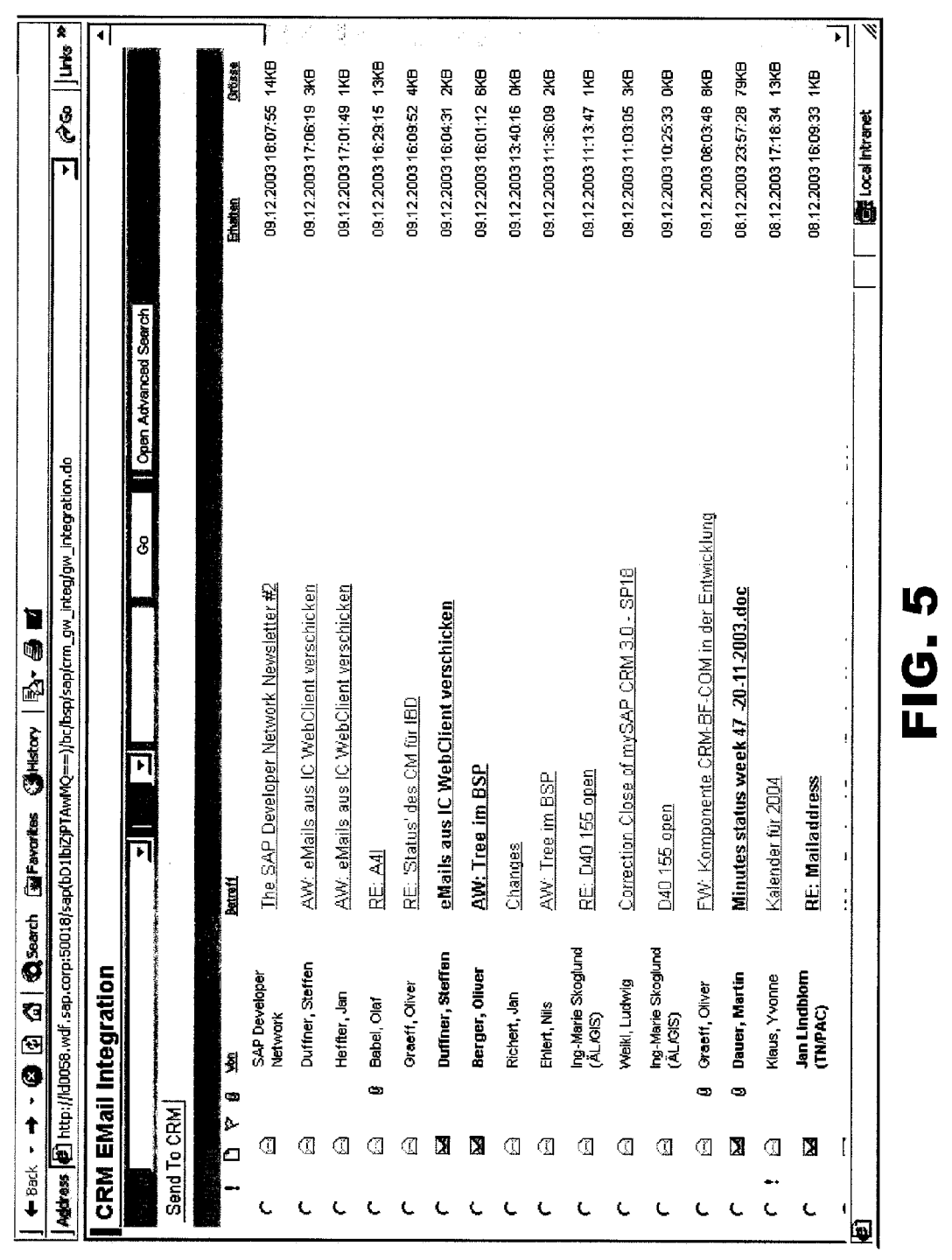

According to another embodiment of the present invention, the groupware application may use a discrete browser to transfer its e-mails when the groupware application does not have its own browser. In such an event, e-mails contained in the groupware application may be copied to the discrete browser via JavaScript and API either periodically at regular intervals or at the operator's request. FIG. 5 illustrates an exemplary browser for processing inbound e-mails, according to another embodiment of the present invention. As explained before, the browser may contain inbox summary only, and not the real copies of all e-mails in the groupware application. The browser may also contain a transfer button embedded via JavaScript and API, which may automatically invoke transfer function calls when the transfer button is pressed by the operator.

Figure 6:
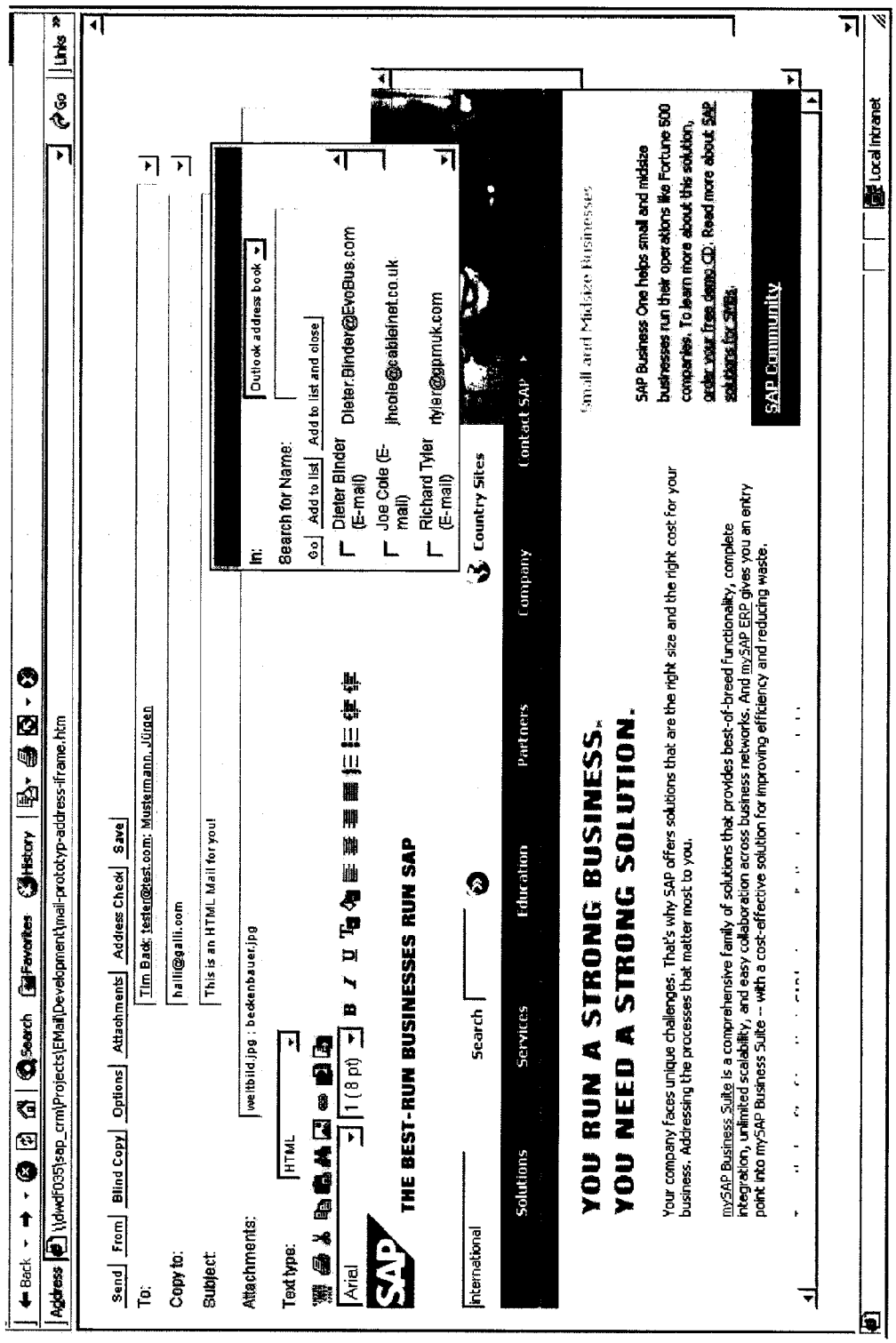
FIG. 6 is a screen shot illustrating an exemplary CRM send screen for processing outbound e-mails, according to an embodiment of the present invention.

FIG. 6 is a screen shot illustrating an exemplary CRM send screen for processing outbound e-mails, according to an embodiment of the present invention. To send an outbound e-mail from the CRM application, the operator may select an account or activity stored in the CRM application. A business partner list may come up with a hypertext link to their e-mail addresses. The operator may add more recipients from this business partner list stored in the CRM application and/or from contacts stored in the groupware application. The operator may enter an e-mail body and include any attachments from the operator's hard disk, the CRM application, customized templates for the business object type, and the like. When the e-mail is sent, an activity is created and stored in the CRM application. Additionally, a copy of the e-mail is stored in the groupware's "Sent Item" box. Because it is a real copy, no synchronization between the copy stored in the groupware application and that in the CRM application is required.

As described above, some embodiments of the present invention provide methods and systems for providing one-to-one e-mail collaboration between e-mails in the CRM application and those in a groupware application. By providing one-to-one e-mail collaboration, some embodiments of the present invention enhance efficiency by speeding up the operator's daily business and allow the CRM operators to be informed of all activities at all times.

Functionality of the foregoing embodiments may be provided on various computer platforms executing program instructions. Such computing platforms commonly include one or more processors, a memory system, and various input/output (I/O) devices. The processor may be any of a plurality of conventional processing systems, including microprocessors, digital signal processors, or field programmable logic arrays. In some applications, it may be advantageous to provide multiple processors (not shown) in the platform. The processor(s) execute program instructions stored in the memory system. The memory system may include any combination of conventional memory circuits, including electrical, magnetic or optical memory systems. For example, the memory system may include read only memories, random access memories, and bulk storage. The memory system not only stores the program instructions representing the various methods described herein but also can store the data items on which these methods operate. The I/O devices permit communication with external devices (not shown) and operators.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer-implemented method comprising:
    embedding an email transfer activation arrangement in a groupware email application program to transfer an inbound email to a customer relationship management (CRM) application system;
    responsive to an activation of the activation arrangement, identifying through a processing device an inbound email in the groupware email application program that has not yet been transferred to the CRM system from the groupware email application program;
    accessing, in response to the activation of the activation arrangement, business partner data included in the CRM system;
    responsive to the accessing of the business partner data, comparing a sender email address of the identified inbound email to the accessed business partner data to identify a sender business partner in the CRM system associated with the identified inbound email;
    responsive to the comparing the sender email address of the identified inbound email to the accessed business partner data, displaying in an interface of the groupware email application a list of business objects associated with the identified sender business partner in the CRM system that is retrieved from the CRM system; and
    responsive to selecting a business object from the list of business objects displayed, transferring a copy of the identified inbound email from the groupware email application program to the CRM system, from which the CRM system generates an activity record in the CRM system associated with the selected business object and the identified sender business partner in which a body of the transferred email copy is included in a text field of the activity record, a subject of the transferred email copy is included in a description field of the activity record, a link to the copy of the transferred email is embedded in the activity record, and the identified sender business partner is specified as a business partner in the activity record.

2. The method of claim 1, wherein the CRM application system is part of an enterprise management system.

3. The method of claim 1, wherein the sender email address of the identified inbound email is compared to an email address book in the CRM system to identify the sender business partner.

4. The method of claim 1, wherein the transferred copy of the identified inbound email from the groupware application is transferred through a browser via an application programming interface (API).

5. The method of claim 1, wherein the transfer occurs at periodic intervals.

6. The method of claim 1, wherein the transfer occurs at an operator request.

7. The method of claim 1, wherein the transfer occurs responsive to activating a transfer button.

8. The method of claim 1, wherein an email is replicated in its entirety during the transfer to the CRM system.

9. The method of claim 1, wherein the groupware email application includes a navigation bar in which an operator may identify a uniform resource locator (URL) of the CRM application system.

10. The method of claim 1, further comprising identifying an email as transferred once the copy of the email is transferred to the CRM application system.

11. The method of claim 1, wherein the activation of the activation arrangement opens a new window displaying the interface.

12. A memory system having stored thereon program instructions that, when executed by a processor, causes the processor to:
    execute an email transfer activation arrangement embedded in a groupware email application program to transfer an inbound email to a customer relationship management (CRM) application system;
    responsive to an activation of the activation arrangement, identify through a processing device an inbound email in the groupware email application program that has not been transferred to the CRM system from the groupware email application program;
    access, in response to the activation of the activation arrangement, business partner data included in the CRM system;
    responsive to the accessing of the business partner data, compare a sender email address of the identified inbound email to the accessed business partner data included to identify a sender business partner in the CRM system associated with the identified inbound email;
    responsive to the comparing the sender email address of the identified inbound email to the accessed business partner data, display in an interface of the groupware email application a list of business objects associated with the identified sender business partner in the CRM system that is retrieved from the CRM system; and
    responsive to selecting a business object from the list of business objects displayed, transfer a copy of the identified inbound email from the groupware email application program to the CRM system, from which the CRM system generates an activity record in the CRM system associated with the selected business object and the identified sender business partner in which a body of the transferred email copy is included in a text field of the activity record, a subject of the transferred email copy is included in a description field of the activity record, a link to the copy of the transferred email is embedded in the activity record, and the identified sender business partner is specified as a business partner in the activity record.

13. The memory system of claim 12, wherein the CRM application system is part of an enterprise management system.

14. The memory system of claim 12, wherein the sender email address of the identified inbound email is compared to an email address book in the CRM system to identify the sender business partner.

15. The memory system of claim 12, wherein the transferred copy of the identified inbound email from the groupware application is transferred through a browser via an application programming interface (API).

16. The memory system of claim 12, wherein the transfer occurs at periodic intervals.

17. The memory system of claim 12, wherein the transfer occurs at an operator request.

18. The memory system of claim 12, wherein the transfer occurs responsive to activating a transfer button.

* * * * *